Jan. 6, 1959     F. J. DUMANOWSKI     2,867,068
CORN HARVESTER

Filed Aug. 28, 1956                               4 Sheets-Sheet 1

INVENTOR:
Ferdinand J. Dumanowski
BY:

Jan. 6, 1959  F. J. DUMANOWSKI  2,867,068
CORN HARVESTER
Filed Aug. 28, 1956  4 Sheets-Sheet 2

INVENTOR:
Ferdinand J. Dumanowski
BY:

INVENTOR:
Ferdinand J. Dumanowski
BY: [signature]

Jan. 6, 1959  F. J. DUMANOWSKI  2,867,068
CORN HARVESTER
Filed Aug. 28, 1956  4 Sheets-Sheet 4

INVENTOR:
Ferdinand J. Dumanowski
BY:

2,867,068

CORN HARVESTER

Ferdinand J. Dumanowski, Davenport, Iowa, assignor to J. I. Case Company, Racine, Wis., a corporation of Wisconsin Application August 28, 1956, Serial No. 606,697

1 Claim. (Cl. 56—15)

This invention relates to a corn harvesting machine and especially to the type used in preparing forage.

This invention is an improvement on a corn harvester which severs the stalks at the ground, snaps the ears from the stalks and conveys the ears to a trailing wagon or truck to be hauled away and stored, and separately carries the severed stalks rearwardly to a cutter wheel where they are reduced to suitable lengths and blown into a wagon for storage as forage.

This invention provides means for improving the quality of the forage by adding the snapped ears to the stalks before the latter are reduced to forage.

Another object is to provide a harvester having provision for retaining the above separation between the ears and stalks or reducing the snapped ears to forage simultaneously with the severed stalks, thus providing forage consisting of the entire plant, if desired.

Further objects will become apparent from a consideration of the following detailed description taken in connection with the accompanying drawings wherein a satisfactory embodiment of the invention is shown. However, it is to be understood, that the invention is not limited to the details disclosed but includes all such variations and modifications as fall within the spirit of the invention.

Referring to the drawings.

Figure 2:
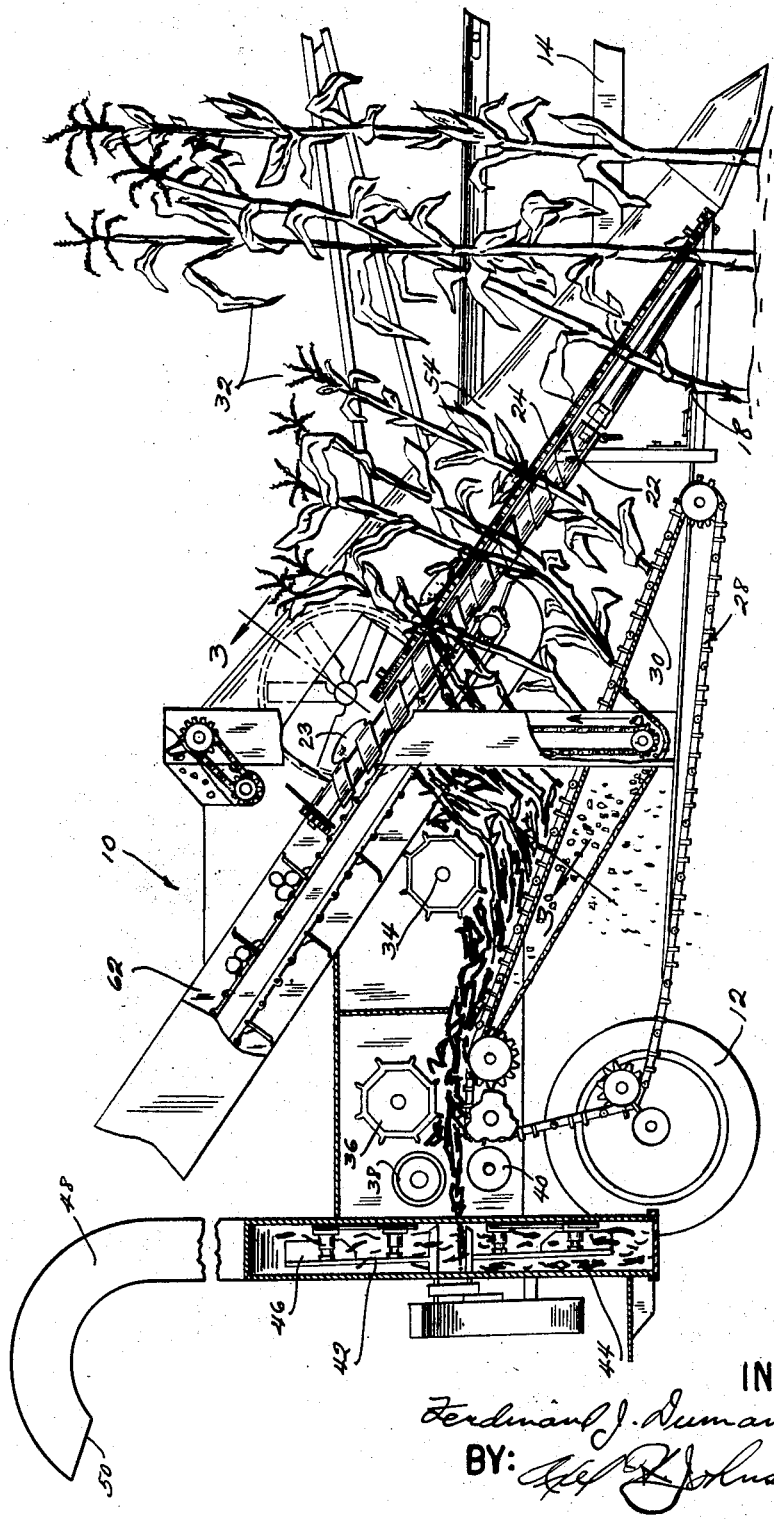
Fig. 2 is a vertical section taken generally at 2—2 of Fig. 1 and with other parts broken away.

Referring again to the drawings, Fig. 2 shows a general arrangement of the harvester taken on a plane in the direction of travel of the machine.

Figure 1:
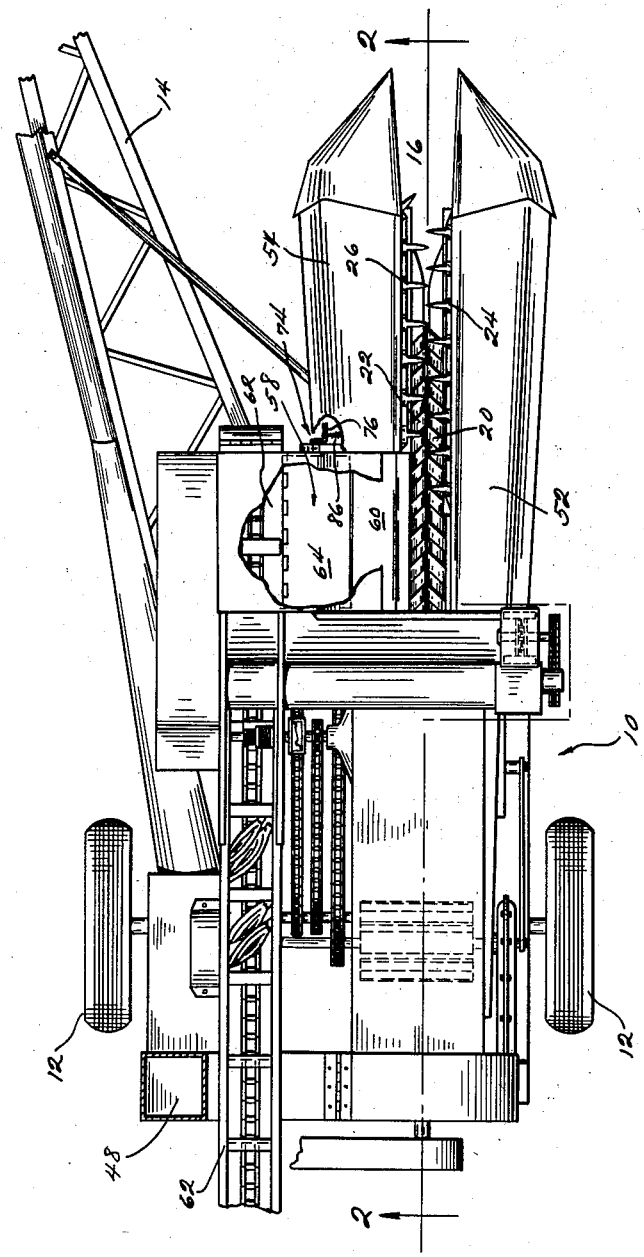
Fig. 1 is a plan view of a typical harvester with parts broken away to show the invention, with parts shown in section.

This invention generally comprises a machine having a transportable frame 10 carried on wheels 12. A draw bar 14 partly broken away as shown in Fig. 1, is connected to a tractor, not shown, which draws the harvester along the row of stalks. As the harvester is transported, the stalks enter a stalk way 16 and are severed from the ground by a cutter 18 shown in Fig. 2.

As a stalk is severed by cutter 18 it is grasped by a pair of rolls 20 and 22, and are urged rearwardly by a pair of rearwardly moving gathering chains 24 so that the stalks are carried substantially vertically. The severed ends of the stalks encounter a rearwardly moving conveyer 28 having an upper flight 30. As stalks 32 are conveyed rearwardly between rolls 20 and 22 the ears 23 are snapped from the stalks and the latter are carried under a pair of beaters 34 and 36 as shown in Fig. 2. As the stalks are carried rearwardly by flight 30, and beaters 34 and 36, they are engaged by squeeze rollers 38 and 40 which are rotated so as to positively feed the stalks into a combined cutter wheel and fan 42 whereby the stalks are reduced to lengths 44 suitable for forage. The fan blade 46 creates a blast of air in stack 48 which carries the cut forage up the stack and out of opening 50 to the trailing vehicle, not shown. Other details of the harvester will not be described unless they concern this invention.

Figure 4:
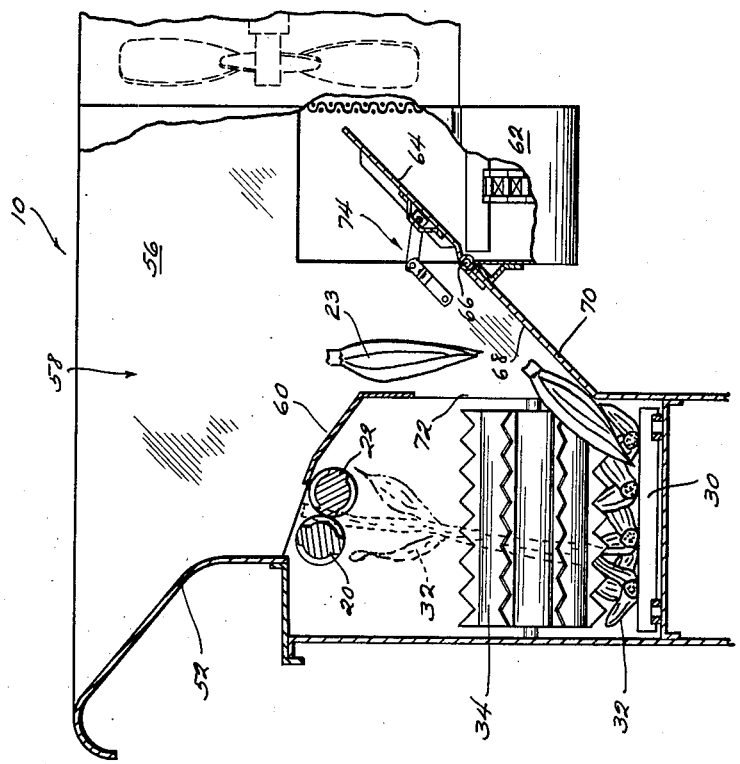
Fig. 4 is a view similar to that of Fig. 3 in which the invention is arranged to convey snapped ears to the stalk conveyer.
Figure 3:
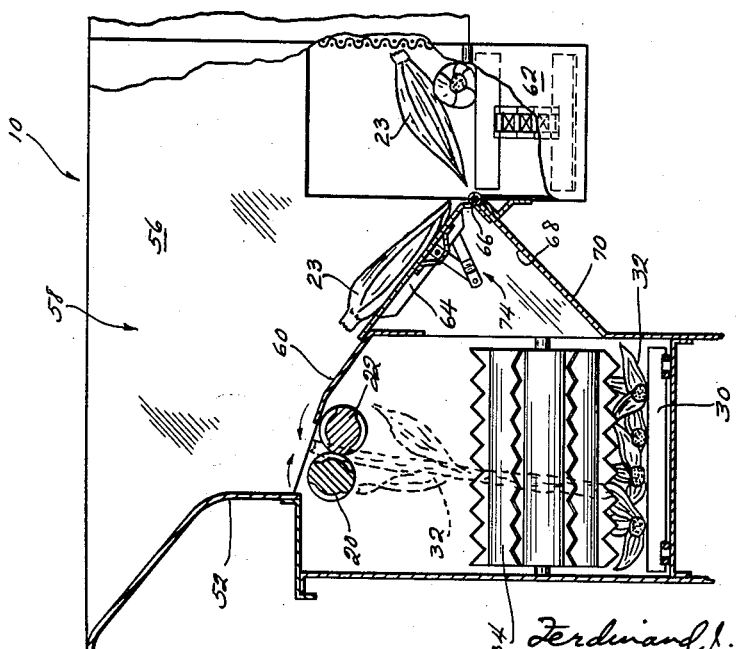
Fig. 3 is an enlarged section taken at 3—3 of Fig. 2 with some parts broken away showing the invention arranged so as to convey snapped ears to the ear conveyer.

Referring to Figs. 1, 3, and 4 sheets 52 and 54 define the rear portion of stalk way 16. A back wall 56 defines the rear end of the stalk way and with sheet 52 defines a hopper 58 having snapping rolls 20 and 22 at the lower portion thereof. An inclined chute portion 60 comprises a portion of the lower floor of chute 58 and provides the inclined surface over which snapped ears pass. An ear conveyer 62 communicates with hopper 58 and conveys snapped ears rearwardly as shown in Figs. 1 and 2.

The invention is specifically shown in Figs. 3 and 4 and comprises a gate 64 which has a hinge 66 on a fore-and-aft axis. Fig. 3 shows gate 64 in position to direct snapped ears to conveyer 62 and in this position gate 64 forms a continuation of inclined portion 60. When an ear is snapped it passes down incline 60, gate 64, and then to conveyer 62, rearwardly to a wagon. Severed stalks 32 are treated as before mentioned, and therefore, are kept separated from the snapped ears.

Referring to Fig. 4, gate 64 has been swung to the opposite side of hopper 58 and forms a continuation of an inclined chute surface 68 which terminates at a point adjacent upper flight 30 of conveyer 28. In this instance the harvester operates as before with the exception that snapped ears 23 pass over portion 60 and then downwardly into a lower hopper defined by a wall 70 and then pass through an opening 72, and mingle with stalks 32 so as to be reduced to forage. After reduction the forage is blown upwardly through stack 48 and out of an opening 50 to a wagon.

Figure 6:
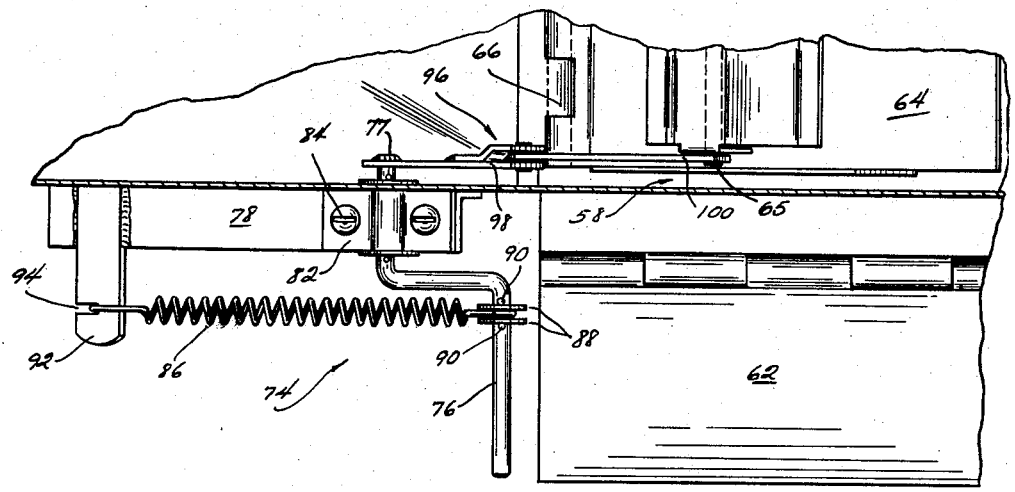
Fig. 6 is a fragmentary plan view with parts in section, of the arrangement shown in Fig. 5.
Figure 5:
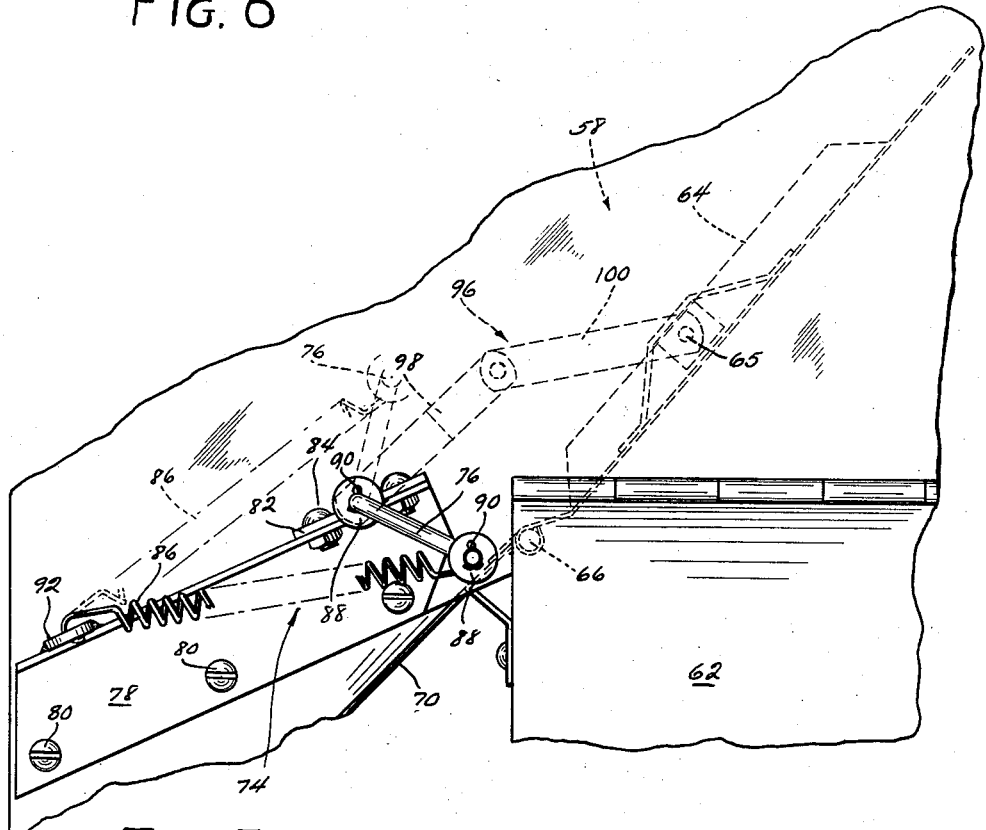
Fig. 5 is an enlarged fragmentary vertical view of the invention in position to deflect ears to the stalk conveyer to be reduced to forage along with the stalks.

A crank means 74 is provided in this instance at one end of hopper 58 and enables an operator to swing gate 64 to either position shown in Figs. 3 and 4. Referring to Figs. 3 through 6, crank means 74 comprises a crank 76 journaled on an angle member 78 which is secured to the side of hopper 58 by bolts 80. Crank 76 passes through a hole in hopper 58 and is journaled in a bearing cap 82 which is secured to angle member 78 by bolts 84 as shown in Figs. 5 and 6. A spring 86 is hooked over crank 74. A washer 88 is placed on each side of spring 86 and cotters 90 prevent shifting of the spring on crank 76. A hook member 92 is secured to angle member 78 by welding or other suitable means. A slot 94 provides means of anchoring the end of the spring 86.

A linkage means 96 comprising a pair of links 98 and 100 pivoted together at their ends. The free ends of link 98 is secured integrally to crank 76 by welding or the like 77. The free end of link 100 is pivoted on gate 64 on a pin 65 in a manner so as to pivot freely thereon.

Spring 86 will urge gate 64 into the position shown in Fig. 5 by biasing crank 76 in a clockwise direction. However, when crank 76 is turned counterclockwise, gate 64 will assume the position shown in Figs. 3 and 5, and spring 86 will bias gate 64 to the position shown in Fig. 3.

It is clear that the applicant has provided an arrangement that will permit the preparation of forage from standing corn, using only the stalk and leaves, or return snapped ears to the stalks to be cut up with the latter as forage.

Having now described my invention, and in what man- ner the same may be used, what I claim as new, and desire to protect by Letters Patent of the United States is:

In a corn harvester for treating standing stalks; having a frame and stalk severing means, a rearwardly moving stalk conveyer, and snapping rolls to snap ears from said stalks, and a rearwardly moving ear conveyer spaced transversely from said stalk conveyer to receive snapped ears, in combination, an ear hopper intermediate said rolls and said ear conveyer, and communicating with said stalk conveyer and said ear conveyer, a transversely-swinging gate disposed in said hopper and pivotally mounted midway between said ear conveyer and said stalk conveyer whereby the gate can be swung into position to direct said snapped ears toward either said stalk conveyer or said ear conveyer, manually-operated crank means at one end of said hopper, a linkage in said hopper adjacent said crank means, said linkage comprising a pair of link members pivoted together at one end and having free ends, the free end of one of said members being pivoted to said gate at a point spaced from said hinge, and the free end of the other member being secured to said crank integrally, and resilient means connected between said crank and said frame to urge said gate toward either of said positions upon manually actuating said crank.

References Cited in the file of this patent

UNITED STATES PATENTS

| Re. 24,151 | Prosser | May 15, 1956 |
| 2,157,619 | McElwain | May 9, 1939 |
| 2,333,901 | Swenson | Nov. 9, 1943 |
| 2,501,097 | Rosenthal | Mar. 21, 1950 |